United States Patent
Yang

(10) Patent No.: US 10,042,600 B2
(45) Date of Patent: Aug. 7, 2018

(54) METHOD FOR CONTROLLING DISPLAY AND ELECTRONIC DEVICE THEREOF

(71) Applicant: Samsung Electronics Co., Ltd., Gyeonggi-do (KR)

(72) Inventor: Jae-Young Yang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 108 days.

(21) Appl. No.: 14/942,512

(22) Filed: Nov. 16, 2015

(65) Prior Publication Data

US 2016/0139685 A1    May 19, 2016

(30) Foreign Application Priority Data

Nov. 14, 2014 (KR) ..................... 10-2014-0158923

(51) Int. Cl.

| G06F 3/0346 | (2013.01) |
|---|---|
| G06F 3/041 | (2006.01) |
| G06F 3/14 | (2006.01) |
| G06T 3/40 | (2006.01) |
| G06F 3/147 | (2006.01) |
| G06F 3/0488 | (2013.01) |
| G06F 3/0485 | (2013.01) |
| G09G 5/14 | (2006.01) |

(52) U.S. Cl.
CPC .......... *G06F 3/1446* (2013.01); *G06F 3/0416* (2013.01); *G06F 3/0485* (2013.01); *G06F 3/0488* (2013.01); *G06F 3/147* (2013.01); *G06F 3/1423* (2013.01); *G06F 2203/04102* (2013.01); *G09G 5/14* (2013.01); *G09G 2340/04* (2013.01); *G09G 2340/0464* (2013.01); *G09G 2340/14* (2013.01); *G09G 2354/00* (2013.01); *G09G 2380/02* (2013.01)

(58) Field of Classification Search
CPC combination set(s) only.
See application file for complete search history.

(56) References Cited

U.S. PATENT DOCUMENTS

| 2006/0224989 | A1 | 10/2006 | Pettiross et al. | |
|---|---|---|---|---|
| 2010/0120470 | A1* | 5/2010 | Kim | G06F 1/1615 455/566 |
| 2013/0215041 | A1* | 8/2013 | Kim | G06F 3/0487 345/173 |
| 2014/0152553 | A1* | 6/2014 | Cha | G06F 3/013 345/156 |
| 2014/0226275 | A1* | 8/2014 | Ko | G06F 1/1626 361/679.27 |

FOREIGN PATENT DOCUMENTS

JP    2008535084    8/2008

* cited by examiner

*Primary Examiner* — Aneeta Yodichkas
*Assistant Examiner* — Krishna Neupane
(74) *Attorney, Agent, or Firm* — The Farrell Law Firm, P.C.

(57) ABSTRACT

An electronic device and a method for controlling the display of an electronic device are provided. The method includes dividing the display into a first area and a second area in response to detecting that the display is bent, displaying a surface of an application on the first area of the display, and displaying a control menu of the application on the second area of the display.

16 Claims, 14 Drawing Sheets

METHOD FOR CONTROLLING DISPLAY AND ELECTRONIC DEVICE THEREOF

PRIORITY

This application claims priority under 35 U.S.C. § 119(a) to a Korean Patent Application filed in the Korean Intellectual Property Office on Nov. 14, 2014 and assigned Serial No. 10-2014-0158923, the entire disclosure of which is incorporated herein by reference.

BACKGROUND

1. Field of the Disclosure

The present disclosure generally relates to a method and apparatus for controlling a display in an electronic device.

2. Description of the Related Art

Electronic devices for performing one or more functions in a complex manner have increased in number in recent years. Further, a mobile terminal which is known as a so-called "smart phone" is generally used as the electronic device. The electronic device such as the mobile terminal has a screen touch-type display module, and can perform communication with another party through a communication module or perform web surfing by accessing a network. Further, the electronic device typically has a high-definition camera module to capture a still picture or a moving picture, in addition to a typical function of performing communication with the other party. Such an electronic device has gradually evolved to employ a high-performance processor, thereby being able to perform various functions.

SUMMARY

The present disclosure has been made to address at least the disadvantages described above and to provide at least the advantages described below.

Accordingly, an aspect of the present disclosure provides a method and apparatus for displaying a surface and a control by separating the surface and the control in a display of an electronic device.

According to an aspect of the present disclosure, an electronic device includes a display, and a processor configured to divide the display into a first area and a second area in response to detecting that the display is bent, control the display to display a surface of an application on the first area of the display, and control the display to display a control menu of the application on the second area of the display.

According to an aspect of the present disclosure, an electronic device includes a plurality of displays, and a processor configured to select a first display and a second display among the plurality of displays in response to detecting a request for displaying multiple displays, control the first display to display a surface of an application on the first display, and control the second display to display a control menu of the application on the second display.

According to an aspect of the present disclosure, a method of operating an electronic device includes dividing the display into a first area and a second area in response to detecting that the display is bent, displaying a surface of an application on the first area of the display, and displaying a control menu of the application on the second area of the display.

According to an aspect of the present disclosure, a method of operating an electronic device includes selecting a first display and a second display among the plurality of displays in response to detecting a request for displaying multiple displays, displaying a surface of a application on the first area of the display, and displaying a control menu of the application on the second area of the display.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION

Figure 1:
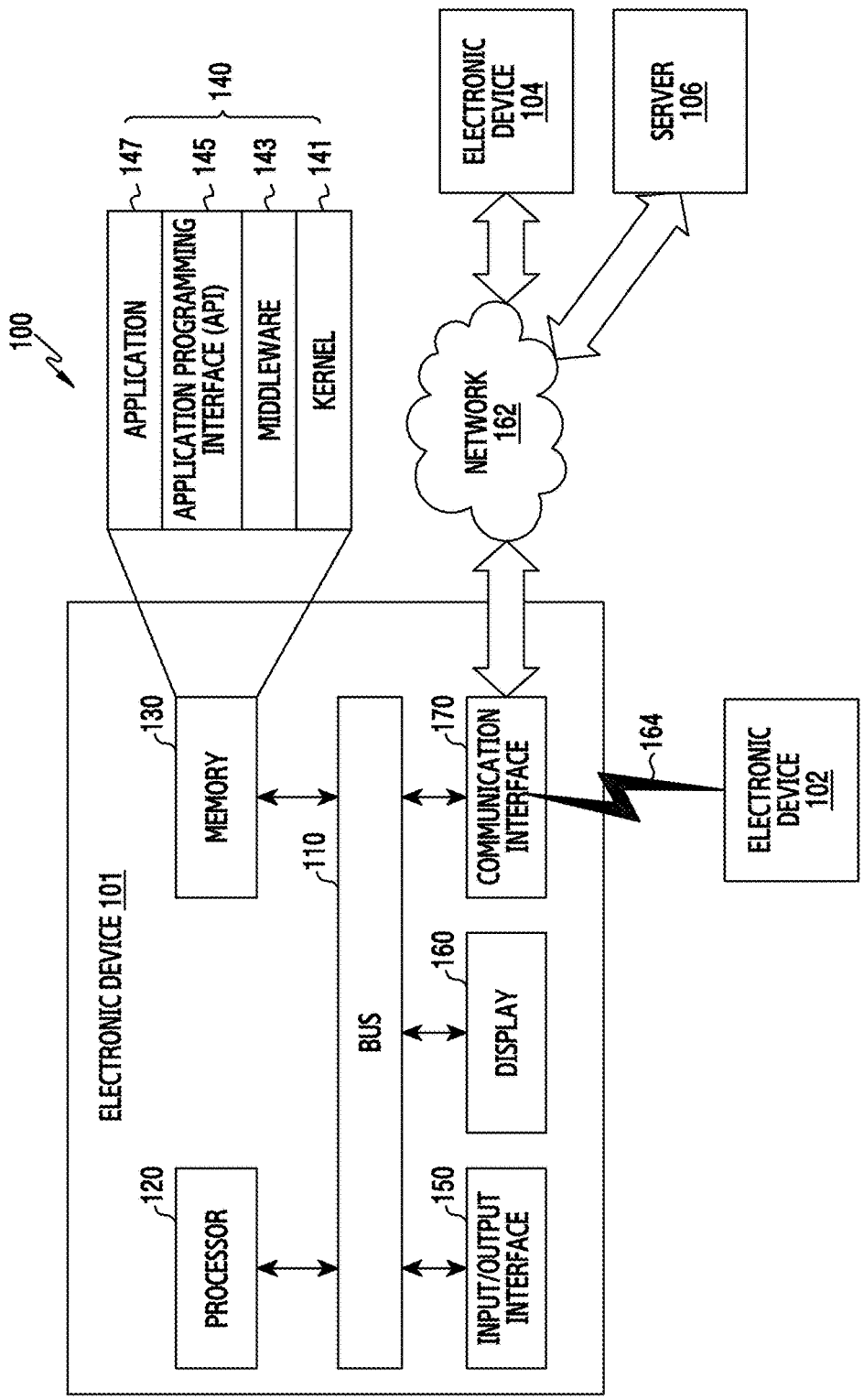
FIG. 1 illustrates a network environment including an electronic device according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively)

coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be replaced with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The terms used in describing the various embodiments of the present disclosure are just for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

An electronic device according to the embodiments of the present disclosure may include at least one of a smartphone, a tablet personal computer (PC), a mobile phone, a video phone, an electronic book reader, a desktop PC, a laptop PC, a netbook computer, a workstation, a server, a Personal Digital Assistant (PDA), a Portable Multimedia Player (PMP), an MP3 player, a mobile medical machine, a camera, or a wearable device (for example, smart glasses, a head-mounted-device (HMD), electronic clothing, an electronic bracelet, an electronic necklace, an electronic appcessory, electronic tattoos, a smart mirror, or a smart watch).

The electronic device may be a smart home appliance. For example, the smart home appliance may include at least one of a television, a Digital Video Disk (DVD) player, a stereo, a refrigerator, an air conditioner, a cleaner, an oven, a microwave oven, a washing machine, an air cleaner, a set-top box, a home automation control panel, a security control panel, a TV box (for example, Samsung HomeSync™, Apple TV™, or Goggle TV™), a game console (for example, Xbox™, PlayStation™), an electronic dictionary, an electronic key, a camcorder, or an electronic album.

The electronic device may also include at least one of various medical machines (for example, various portable medical measurement devices (such as a glucose monitor, a heart rate monitor, a blood pressure measuring device, or a thermometer), Magnetic Resonance Angiography (MRA), Magnetic Resonance Imaging (MRI), Computerized Tomography (CT), a tomograph, an ultrasound machine, and the like), a navigation device, a Global Positioning System (GPS) receiver, an Event Data Recorder (EDR), a Flight Data Recorder (FDR), an automotive infotainment device, electronic equipment for ship (such as navigation equipment for ship, a gyro compass, and the like), avionics, a security device, a head unit for vehicles, an industrial or home robot, an automatic teller machine (ATM) of a financial institution, point of sales (POS) device of a store, or Internet of Things (for example, a lamp, various sensors, an electric or gas meter, a sprinkler, a fire alarm, a thermostat, a streetlamp, a toaster, an exercising machine, a hot water tank, a heater, a boiler, etc.).

The electronic device may further include at least one of a part of furniture or a building/a structure, an electronic board, an electronic signature receiving device, a projector, and various measurement devices (such as devices for measuring water, power, gas, radio waves, and the like). The electronic device may be one or a combination of one or more of the above-mentioned devices. In addition, the electronic device may be a flexible electronic device. In addition, the electronic device according to the present disclosure is not limited to the above-mentioned devices, and may include new electronic devices according to the development of new technologies.

Hereinafter, an electronic device according to various embodiments of the present disclosure will be explained with reference to the accompanying drawings. The term "user" as used herein may refer to a person who uses the electronic device or a device that uses the electronic device (for example, an artificial intelligence electronic device).

FIG. 1 illustrates a view showing a network environment including an electronic device according to an embodiment of the present disclosure.

Referring to FIG. 1, the electronic device 101 in the network environment 100 according to an embodiment of the present disclosure will be described. The electronic device 101 may include a bus 110, a processor 120, a memory 130, an input and output interface 150, a display 160, and a communication interface 170. The electronic device 101 may omit at least one of the elements or may include additional other elements.

The bus 110 may include a circuit which connects the elements 110-170 with one another and transmits communication (for example, a control message and/or data) between the elements.

The processor 120 may include one or more of a central processing unit (CPU), an application processor (AP), or a communication processor (CP). The processor 120 may execute calculations or data processing related to control and/or communication with at least one other element of the electronic device 101.

The memory 130 may include a volatile and/or non-volatile memory. For example, the memory 130 may store instructions or data which is related to at least one other element of the electronic device 101. The memory 130 may store software and/or a program 140. The program 140 may include a kernel 141, middleware 143, an Application Programming Interface (API) 145, and/or an application program (or an application) 147, and the like. At least some of the kernel 141, the middleware 143, or the API 145 may be referred to as an operating system (OS).

The kernel 141 may control or manage system resources (for example, the bus 110, the processor 120, the memory 130, and the like) which are used for performing operations or functions implemented in the other programs (for example, the middleware 143, the API 145, or the application 147). In addition, the kernel 141 may provide an interface for allowing the middleware 143, the API 145, or the application program 147 to access an individual element of the electronic device 101 and control or manage the system resources.

The middleware 143 may serve as an intermediary to allow the API 145 or the application program 147 to communicate with the kernel 141 and exchange data with the kernel 141.

In addition, the middleware 143 may process one or more operation requests received from the application program 147 according to priority. For example, the middleware 143 may give priority to use the system resources of the electronic device 101 (for example, the bus 110, the processor 120, the memory 130, and the like) to at least one of the application programs 147. For example, the middleware 143 may perform scheduling or load balancing with respect to the one or more operation requests by processing the one or more operation requests according to the priority given to the at least one application program.

The API 145 may be an interface for allowing the application 147 to control a function provided by the kernel 141 or the middleware 143, and may include at least one interface or function (or instructions) for controlling a file, controlling a window, processing an image, or controlling a text.

The input and output interface 150 may serve as an interface for transmitting instructions or data inputted from a user or another external device to other element(s) of the electronic device 101. In addition, the input and output interface 150 may output instructions or data received from other element(s) of the electronic device 101 to the user or another external device.

The display 160 may include a liquid crystal display (LCD), a light emitting diode (LED) display, an organic light emitting diode (OLED) display, or a microelectromechanical system (MEMS) display, or an electronic paper display. The display 160 may display various contents (for example, a text, an image, a video, an icon, a symbol, etc.) for the user. The display 160 may include a touch screen, and may receive input of a touch using an electronic pen or a part of a user's body, a gesture, approach, or hovering.

The communication interface 170 may establish communication between the electronic device 101 and an external device (for example, a first external electronic device 102, a second external electronic device 104, or a server 106). The communication interface 170 may be connected to a network 162 via wireless communication or wire communication to communicate with the external device 104, or the server 106.

The wireless communication may use, as a cellular communication protocol, at least one of Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), or Global System for Mobile Communications (GSM), etc. In addition, the wireless communication may include short-distance communication 164. For example, the short-distance communication 164 may include at least one of Wireless Fidelity (WiFi), Bluetooth, Near Field Communication (NFC), GPS, etc. The wire communication may include at least one of a Universal Serial Bus (USB), a High Definition Multimedia Interface (HDMI), a Recommended Standard 232 (RS-232), or plain old telephone service (POTS). The network 162 may include a telecommunications network, for example, at least one of a computer network (for example, a LAN or WAN), Internet, or a telephone network.

Each of the first external electronic device 102 and the second external electronic device 104 may be the same kind of electronic device as the electronic device 101 or a different kind of device. According to an embodiment of the present disclosure, the server 106 may include a group of one or more servers. Furthermore, all or a part of the operations executed in the electronic device 101 may be executed in another electronic device or a plurality of other electronic devices, such as the electronic devices 102, 104 or the server 106. When the electronic device 101 should perform a certain function or service automatically or in response to a request, the electronic device 101 may request another device 102, 104 or the server 106 to perform at least some function related to the certain function or service additionally or instead of executing the function or service by itself. The electronic devices 102, 104 or the server 106 may execute the requested function or additional function, and transmit the result to the electronic device 101. The electronic device 101 may process the received result as it is or additionally, and provide the requested function or service. To achieve this, cloud computing, distributed computing, or client-server computing technology may be used, for example.

Figure 2:
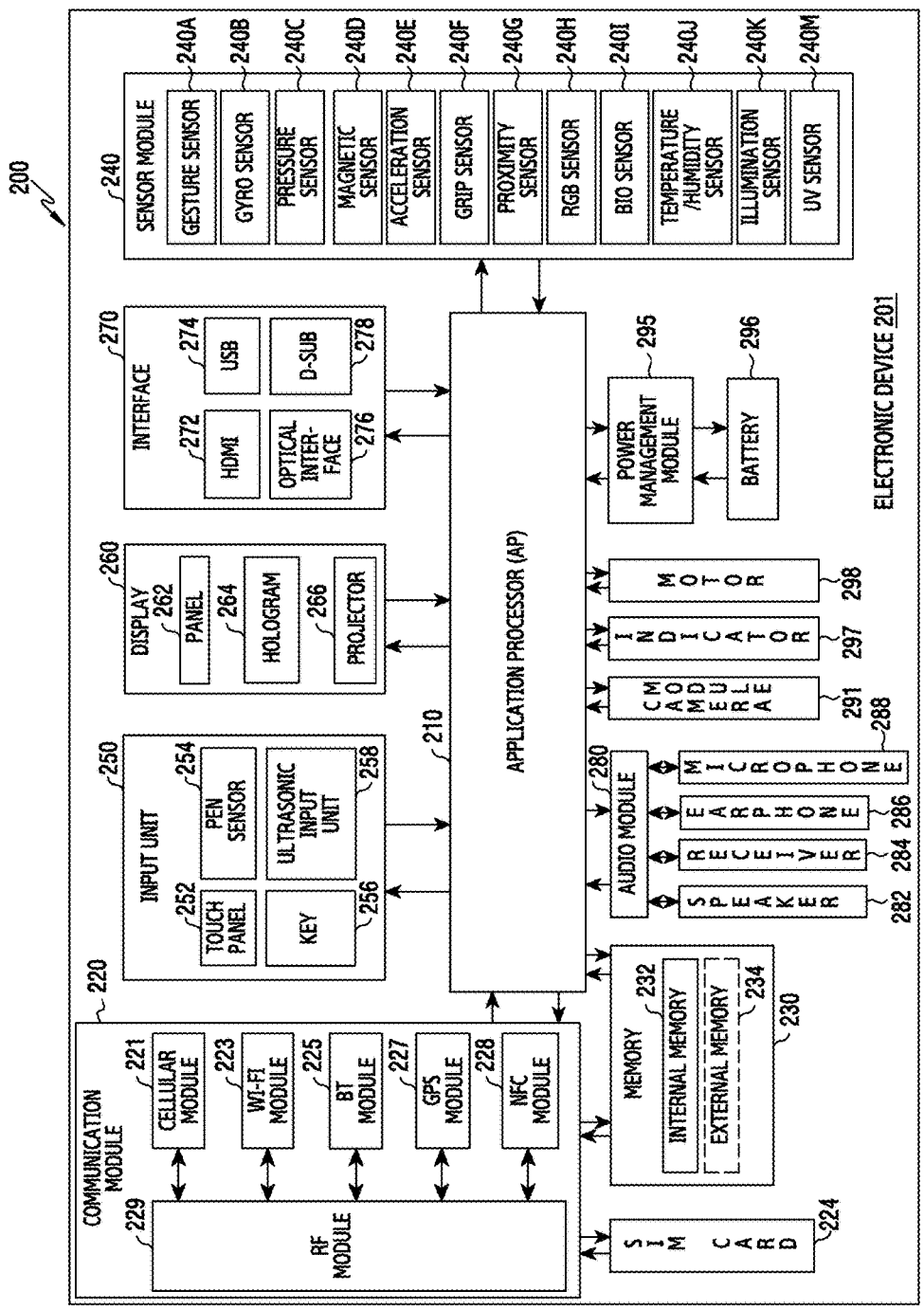
FIG. 2 illustrates a block diagram of an electronic device according to an embodiment of the present disclosure.

FIG. 2 illustrates a block diagram of an electronic device 201 according to an embodiment of the present disclosure. The electronic device 201 may include an entirety or part of the electronic device 101 shown in FIG. 1.

Referring to FIG. 2, the electronic device 201 may include one or more processors 210 (for example, an Application Processor (AP)), a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software elements connected to the processor 210 by driving an operating system or an application program, and may process and calculate various data. For example, the processor 210 may be implemented by using a System on Chip (SoC). The processor 210 may further include a Graphic Processing Unit (GPU) and/or an image signal processor. The processor 210 may include at least part of the elements shown in FIG. 2 (for example, the cellular module 221). The processor 210 may load instructions or data received from at least one of the other elements (for example, a non-volatile memory) into a volatile memory and process the instructions or data, and may store various data in the non-volatile memory.

The communication module 220 may have a same or similar configuration as that of the communication interface 170 of FIG. 1. For example, the communication module 220 may include the cellular module 221, a Wireless Fidelity (WiFi) module 223, a Bluetooth (BT) module 225, a Global Positioning System (GPS) module 227, a near field communication (NFC) module 228, and a Radio Frequency (RF) module 229.

The cellular module 221 may provide a voice call, a video call, a text service, or an Internet service through a telecommunications network. The cellular module 221 may identify and authenticate the electronic device 201 in the telecommunications network by using the SIM card 224). The cellular module 221 may perform at least some of the functions provided by the processor 210. The cellular module 221 may include a communication processor (CP).

The WiFi module 223, the BT module 225, the GPS module 227, and the NFC module 228 each may include a processor for processing data received and transmitted through a corresponding module. At least some (for example, two or more) of the cellular module 221, the WiFi module 223, the BT module 225, the GPS module 227, and the NFC module 228 may be included in a single integrated chip (IC) or a single IC package.

The RF module 229 may transmit and receive communication signals, such as an RF signal). For example, the RF module 229 may include a transceiver, a Power Amp Module (PAM), a frequency filter, a Low Noise Amplifier (LNA), an antenna, etc. At least one of the cellular module 221, the WiFi module 223, the BT module 225, the GPS module 227, and the NFC module 228 may transmit and receive an RF signal through a separate RF module.

The SIM card 224 may include an embedded SIM including the subscriber identification module, and may include its unique identification information (for example, an Integrated Circuit Card Identifier (ICCID)) or subscriber information (for example, International Mobile Subscriber Identity (IMSI)).

The memory 230 (or memory 130) may include an internal memory 232 or an external memory 234. The internal memory 232 may include at least one of a volatile memory (for example, a Dynamic Random Access Memory (DRAM), a Static Random Access Memory (SRAM), a Synchronous DRAM (SDRAM), and the like) and a non-volatile memory (for example, an One-Time Programmable Read Only Memory (OTPROM), a Programmable Read Only Memory (PROM), an Erasable Programmable Read Only Memory (EPROM), an Electrically Erasable Programmable Read Only Memory (EEPROM), a mask ROM, a flash ROM, a flash memory (for example, a NAND flash memory, a NOR flash memory, and the like), a hard drive, a solid state drive (SSD).

The external memory 234 may further include a flash drive, for example, Compact Flash (CF), Secure Digital (SD), Micro-SD, Mini-SD, extreme-Digital (xD), a Multi Media Card (MMC), memory stick, and the like. The external memory 234 may be functionally and/or physically connected with the electronic device 201 through various interfaces.

The sensor module 240 may measure a physical quantity or detect an operation state of the electronic device 201, and may convert measured or detected information into electric signals. The sensor module 240 may include at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (e.g., Red, Green, Blue (RGB) sensor), a biosensor 240I, a temperature/humidity sensor 240J, an illumination sensor 240K, and an Ultraviolet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared ray (IR) sensor, an iris sensor, and/or a fingerprint sensor, and the like. The sensor module 240 may further include a control circuit to control at least one sensor included therein. The electronic device 201 may further include a processor configured to control the sensor module 240 as a part of the processor 210 or a separate part, and may control the sensor module 240 while the processor 210 is in a sleep state.

The input device 250 may include a touch panel 252, a (digital) pen sensor 254, a key 256, or an ultrasonic input device 258. The touch panel 252 may use at least one of capacitive, resistive, infrared, and ultrasonic methods. In addition, the touch panel 252 may further include a control circuit. The touch panel 252 may further include a tactile layer to provide a tactile response to the user.

The (digital) pen sensor 254 may be a part of the touch panel or may include a separate detection sheet. The key 256 may include a physical button, an optical key, or a keypad. The ultrasonic input device 258 may detect ultrasonic waves generated in an input tool through a microphone 288, and identify data corresponding to the detected ultrasonic waves.

The display 260 (or display 160) may include a panel 262, a hologram device 264, or a projector 266. The panel 262 may have a same or similar configuration as or to that of the display 160 of FIG. 1. For example, the panel 262 may be implemented to be flexible, transparent, or wearable. The panel 262 may be configured as a single module along with the touch panel 252. The hologram device 264 may show a stereoscopic image in the air using interference of light. The projector 266 may display an image by projecting light onto a screen or surface. The screen may be located inside or outside the electronic device 201. The display 260 may further include a control circuit to control the panel 262, the hologram device 264, or the projector 266.

The interface 270 may include a High Definition Multimedia Interface (HDMI) 272, a Universal Serial Bus (USB) 274, an optical interface 276, or D-subminiature (sub) 278. The interface 270 may be included in the communication interface 170 shown in FIG. 1. Additionally or alternatively, the interface 270 may include a Mobile High Definition Link (MHL) interface, a Secure Digital (SD) card/Multimedia Card (MMC) interface or Infrared Data Association (IrDA) standard interface.

The audio module 280 may convert a sound and an electric signal bidirectionally. For example, at least some elements of the audio module 280 may be included in the input and output interface 150 shown in FIG. 1. The audio module 280 may process sound information which is input or output through a speaker 282, a receiver 284, an earphone 286, or the microphone 288.

The camera module 291 is a device for photographing a still image and a moving image, and according to an embodiment of the present disclosure, the camera module 291 may include one or more image sensors (for example, a front surface sensor or a rear surface sensor), a lens, an Image Signal Processor (ISP), or a flash (for example, a Light Emitting Diode (LED) or a xenon lamp).

The power management module 295 may manage power of the electronic device 201. According to an exemplary embodiment, the power management module 295 may include a Power Management IC (PMIC), a charger IC, or a battery gauge. For example, the PMIC may utilize a wire charging method and/or a wireless charging method. The wireless charging method may include a magnetic resonance method, a magnetic induction method, or an electromagnetic wave method, and an additional circuit for charging wirelessly, for example, a coil loop, a resonant circuit, a rectifier, and the like may be added. For example, the battery gauge may measure a remaining battery life of the battery 296, a voltage, a current, or temperature during charging. The battery 296 may include a rechargeable battery and/or a solar battery.

The indicator 297 may display a specific state of the electronic device 201 or a part of it (for example, the processor 210), for example, a booting state, a message state, or a charging state. The motor 298 may convert an electric signal into a mechanical vibration, and cause a vibration or haptic effect. Although not shown, the electronic device 201 may include a processing device (for example, a GPU) for supporting a mobile TV. The processing device for supporting the mobile TV may process media data according to standards such as Digital Multimedia Broadcasting (DMB), Digital Video Broadcasting (DVB), or media flow.

Each of the above-described elements of the electronic device according to various embodiments of the present disclosure may be comprised of one or more components, and the names of the elements may vary according to the kind of the electronic device. The electronic device according to various embodiments of the present disclosure may include at least one of the above-described elements, and some of the elements may be omitted or an additional element may be further included. In addition, some of the elements of the electronic device may be combined into a single entity, and may perform the same functions as those of the elements before being combined.

Figure 3:
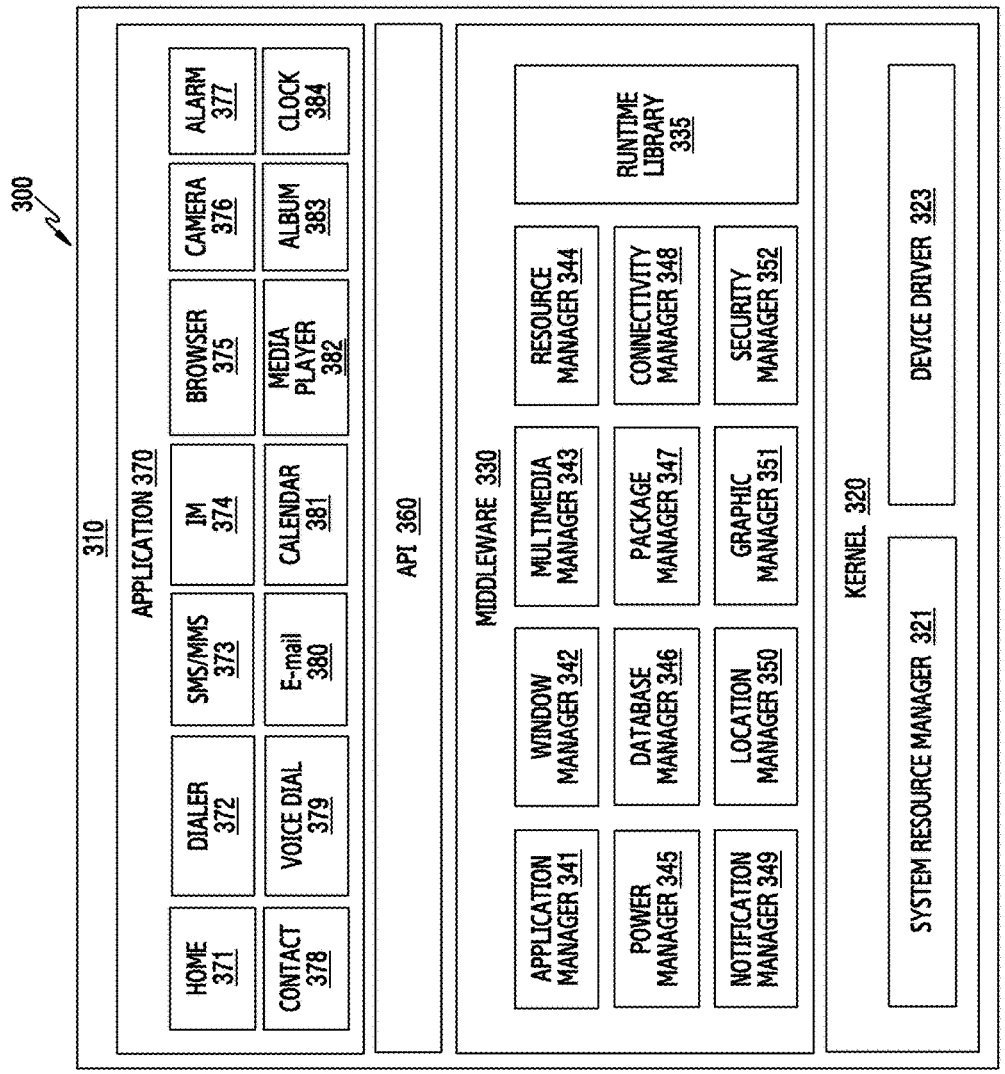
FIG. 3 illustrates a block diagram of a program module according to an embodiment of the present disclosure.

FIG. 3 illustrates a block diagram of a program module according to an embodiment of the present disclosure. The program module 310 (or program 140) may include an Operating System (OS) for controlling resources related to an electronic device 101 and/or various applications, such as application 147, driven on the OS. For example, the OS may be Android, iOS, Windows, Symbian, Tizen, Bada, or the like.

Referring to FIG. 3, the program module 310 may include a kernel 320, middleware 330, an Application Programming Interface (API) 360, and/or an application 370. At least part of the program module 310 may be preloaded on the electronic device or downloaded from an external device 102, 104, the server 106, or the like.

The kernel 320 (or the kernel 141) may include a system resource manager 321 and/or a device driver 323. The system resource manager 321 may control, allocate or collect the system resources. The system resource manager 321 may include a process manager, a memory manager, a file system manager, and the like. The device driver 323 may include a display driver, a camera driver, a Bluetooth driver, a shared memory driver, a Universal Serial Bus (USB) driver, a keypad driver, a WiFi driver, an audio driver, or an Inter-Process Communication (IPC) driver.

The middleware 330 may provide functions which are commonly required by the application 370 or may provide various functions to the application 370 through the API 360 such that the application 370 can effectively use limited system resources in the electronic device. The middleware 330 (or the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module which is used by a compiler to add a new function through a programming language while the application 370 is executed. The runtime library 335 may perform functions on input/output management, memory management, an arithmetic function, and the like.

The application manager 341 may manage a life cycle of at least one of the applications 370, for example. The window manager 342 may manage GUI resources used in a screen. The multimedia manager 343 grasps a format necessary for reproducing various media files and encodes or decodes the media files by using a coder/decoder (codec) suited to the corresponding format. The resource manager 344 may manage resources such as a source code, a memory, or a storage space of at least one of the applications 370.

The power manager 345 operates along with a Basic Input/Output System (BIOS) to manage a battery or power and provide power information necessary for operations of the electronic device. The database manager 346 may generate, search, or change a database which is used in at least one of the applications 370. The package manager 347 may manage installing or updating an application which is distributed in the form of a package file.

The connectivity manager 348 may manage wireless connections utilizing WiFi, Bluetooth, and the like. The notification manager 349 may display or notify a user of an event such as a message arrival, an appointment, a notification of proximity in such a manner that the event does not hinder the user. The location manager 350 may manage location information of the electronic device. The graphic manager 351 may manage a graphic effect to be provided to the user or a relevant user interface. Herein, the graphic manager 351 may include a DALi graphic engine. The security manager 352 may provide an overall security function necessary for system security or user authentication. According to an embodiment of the present disclosure, when the electronic device 101 is equipped with a telephony function, the middleware 330 may further include a telephony manager to manage a speech or video telephony function of the electronic device. According to an embodiment of the present disclosure, the middleware 330 may further include an active manager to create a virtual activity so that a window of an application currently displayed through the first display is displayed on the second display.

The middleware 330 may include a middleware module to perform a combination of the various functions of the above-described elements. The middleware 330 may provide a module which is customized according to a type of OS to provide a distinct function. In addition, the middleware 330 may dynamically delete some of the existing elements or may add new elements.

The API 360 (or the API 145) is a set of API programming functions and may be provided as a different configuration according to an OS. For example, in the case of Android or iOS, a single API set may be provided for each platform. In the case of Tizen, two or more API sets may be provided for each platform.

The application 370 (or the application 147) may include one or more applications for providing functions, such as a home 371, a dialer 372, a Short Message Service (SMS)/Multimedia Messaging Service (MMS) 373, an Instant Message (IM) 374, a browser 375, a camera 376, an alarm 377, contacts 378, a voice dial 379, an email 380, a calendar 381, a media player 382, an album 383, and a clock 384, and may also include a health care function (for example, measuring exercise or a blood sugar level), or providing environment information (for example, information on atmospheric pressure, humidity, or temperature).

According to an embodiment of the present disclosure, the application 370 may include an application for supporting information exchange between the electronic device 101 and an external electronic device 102 and/or 104 (hereinafter, an "information exchange application"). The information exchange application may include a notification relay application for relaying specific information to an external electronic device or a device management application for managing an external electronic device.

The notification relay application may include a function of relaying notification information generated by other applications of the electronic device (such as the SMS/MMS application, the email application, the health care application, the environment information application, and the like) to an external electronic device 102 and/or 104). In addition, the notification relay application may receive notification information from an external electronic device and may relay the same to the user.

The device management application may manage (i.e., install, delete or update) at least one function of an external electronic device 104 communicating with the electronic device (for example, turning on/off an external electronic device (or some parts) or adjusting brightness (or resolution) of a display), an application operating in the external electronic device, or a service provided by the external electronic device (for example, a calling service or a message service).

According to an embodiment of the present disclosure, the application 370 may include an application, such as a health care application of a mobile medical device, which is specified according to an attribute of the external electronic device 102 and/or 104. The application 370 may include an application received from an external electronic device, such as the server 106 or the electronic devices 102 and/or 104). The application 370 may include a preloaded application or a third party application which may be downloaded from a server. The names of the elements of the program module 310 according to the illustrated embodiments may be changed according to a type of OS.

According to an embodiment of the present disclosure, at least part of the program module 310 may implemented by using software, firmware, hardware, or a combination of two or more of them. At least part of the program module 310 may be implemented or executed by a processor such as the processor 210. At least part of the program module 310 may include a module, a program, a routine, sets of instructions, or a process to perform one or more functions.

According to an embodiment of the present disclosure, an electronic device may include a display, and a processor configured to divide the display into a first area and a second area in response to detecting that the display is bent, control the display to display a surface of an application on the first area of the display, and control the display to display a control menu of the application on the second area of the display.

According to an embodiment of the present disclosure, an electronic device may include a plurality of displays, and a processor configured to select a first display and a second display among the plurality of displays in response to detecting a request for displaying multiple displays, control the first display to display a surface of an application on the first display, and control the second display to display a control menu of the application on the second display.

Figure 4:
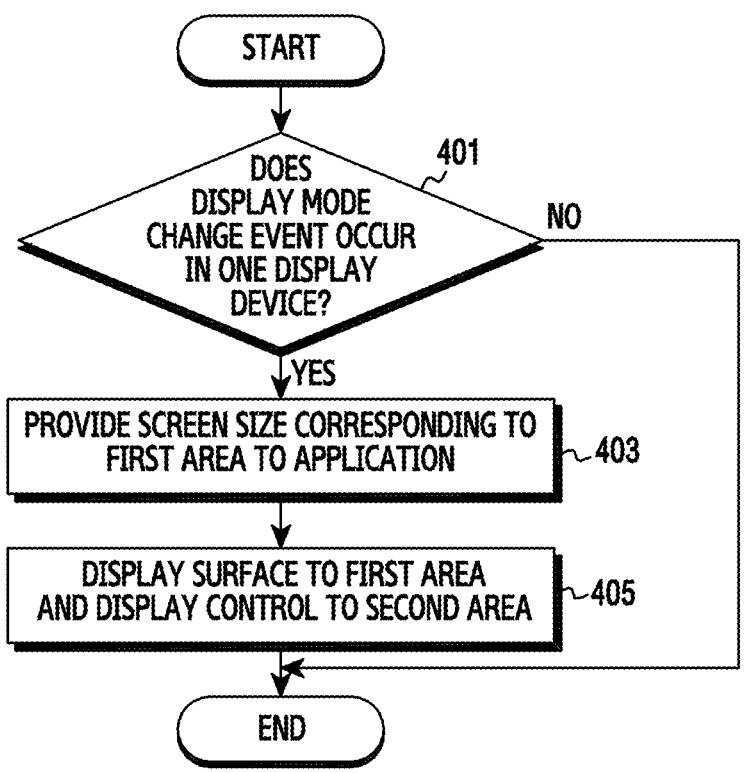
FIG. 4 illustrates a flowchart for controlling one display in an electronic device according to an embodiment of the present disclosure.

FIG. 4 illustrates a flowchart for controlling one display in an electronic device according to an embodiment of the present disclosure.

Figure 5A:
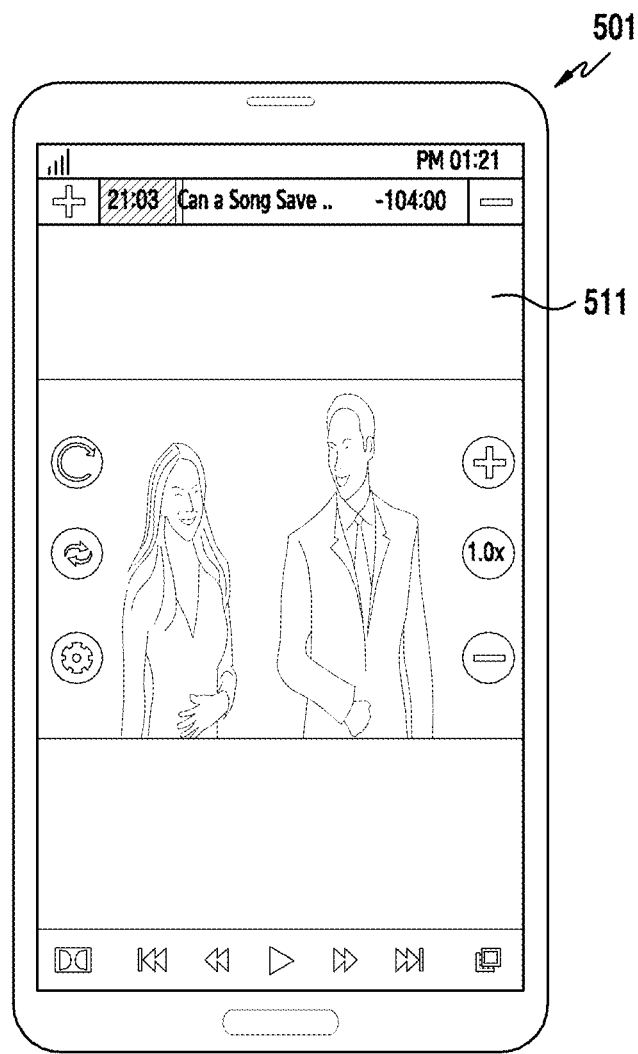
FIG. 5A to FIG. 5E illustrate a screen configuration for controlling one display in an electronic device according to an embodiment of the present disclosure.
Figure 5B:
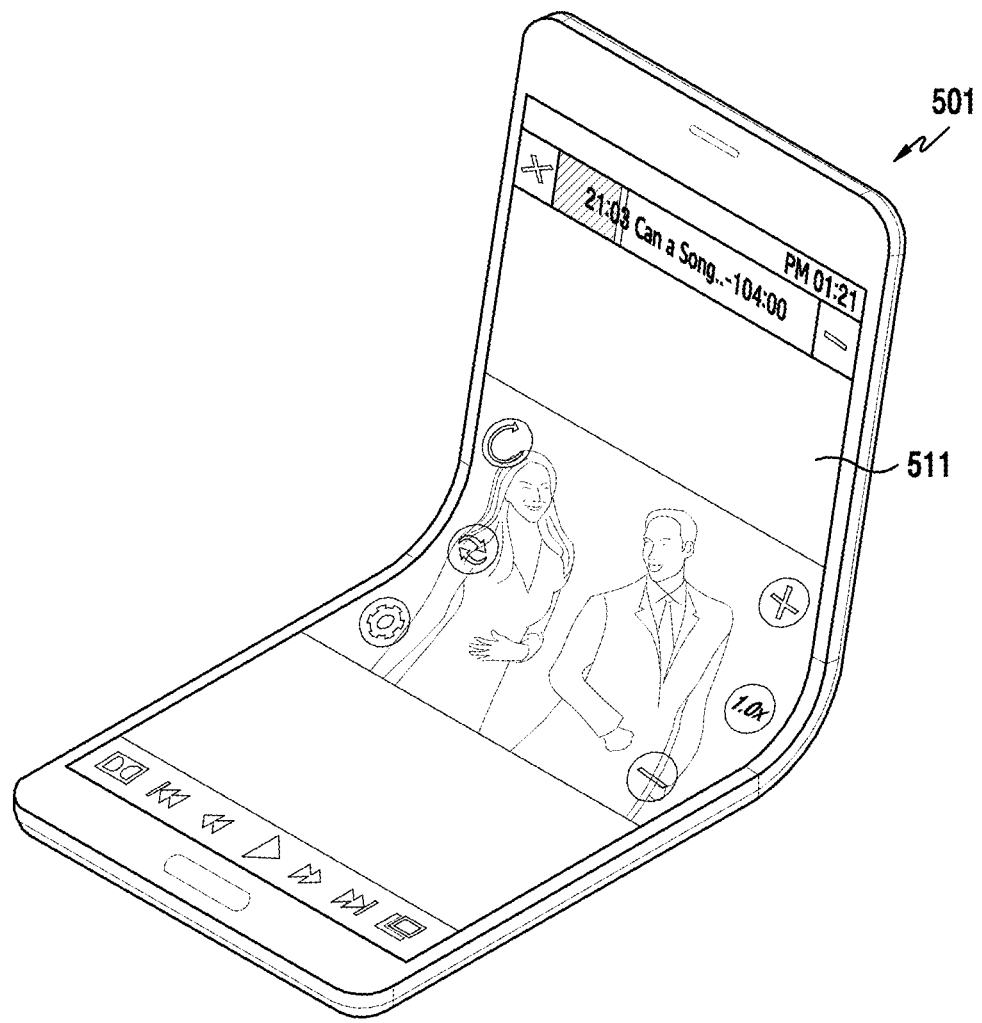

Referring to FIG. 4, in operation 401, the electronic device confirms whether a display mode change event occurs. According to an embodiment of the present disclosure, while a moving picture 511 is displayed through a display portion as shown in FIG. 5A, an electronic device 501 may confirm whether the display portion is bent as shown in FIG. 5B. When the display portion is bent, the electronic device may recognize that the display mode change event occurs.

In operation 403, the electronic device provides a screen size corresponding to a first area to an application. If it is recognized that the display mode change event occurs as shown in FIG. 5B, the electronic device 501 (such as window manager 342) may provide a screen size corresponding to at least one area among areas which are divided when the display portion is bent to an application (such as application 370) for providing a display of a moving picture before the display portion is bent. For example, in a case where one display portion is bent and thus is divided into two areas, the electronic device (such as window manager 342) may provide a screen size corresponding to any one of the two areas to an application (such as application 370) currently displayed to the display portion as a screen size for displaying display data of the application.

Figure 5C:
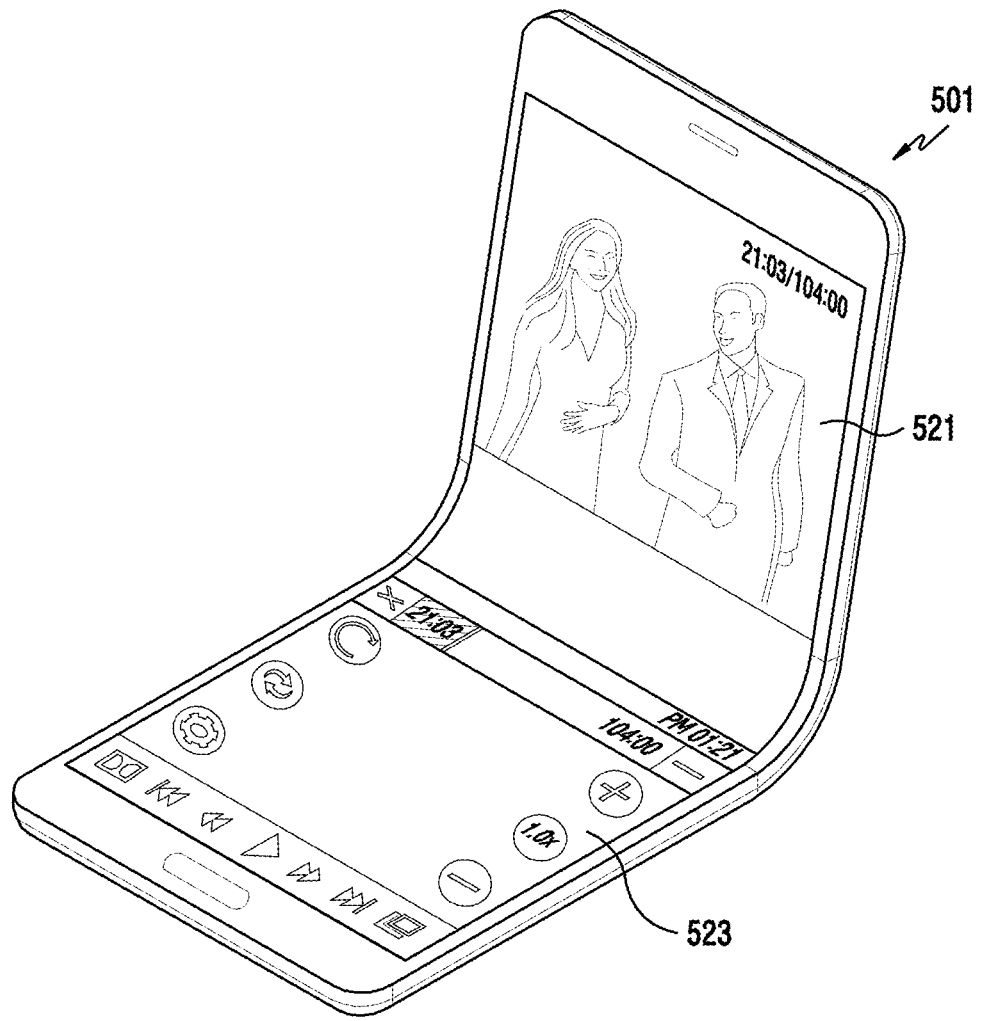

In operation 405, the electronic device displays a surface to a first area and displays a control to a second area. As shown in FIG. 5C, the electronic device 501 (such as window manager 342) may provide a screen size of a first area 521 to an application (such as application 370) for reproducing a moving picture to display the moving picture corresponding to a surface of the application on the first area. As shown in FIG. 5C, the electronic device 501 (such as window manager 342) may provide the screen size of the first area 521 to the application (such as application 370) for reproducing the moving picture to display the surface of the application to the first area 521, and displays a control on a second area 523. That is, in a case where a display portion is bent and thus an area is divided while a moving picture is reproduced, the electronic device may display the moving picture currently reproduced on at least one area among the divided areas, and may display a menu (i.e., a control) for controlling the moving picture on the remaining areas. Herein, the surface of the application includes display of content information executed in the application.

Figure 5D:
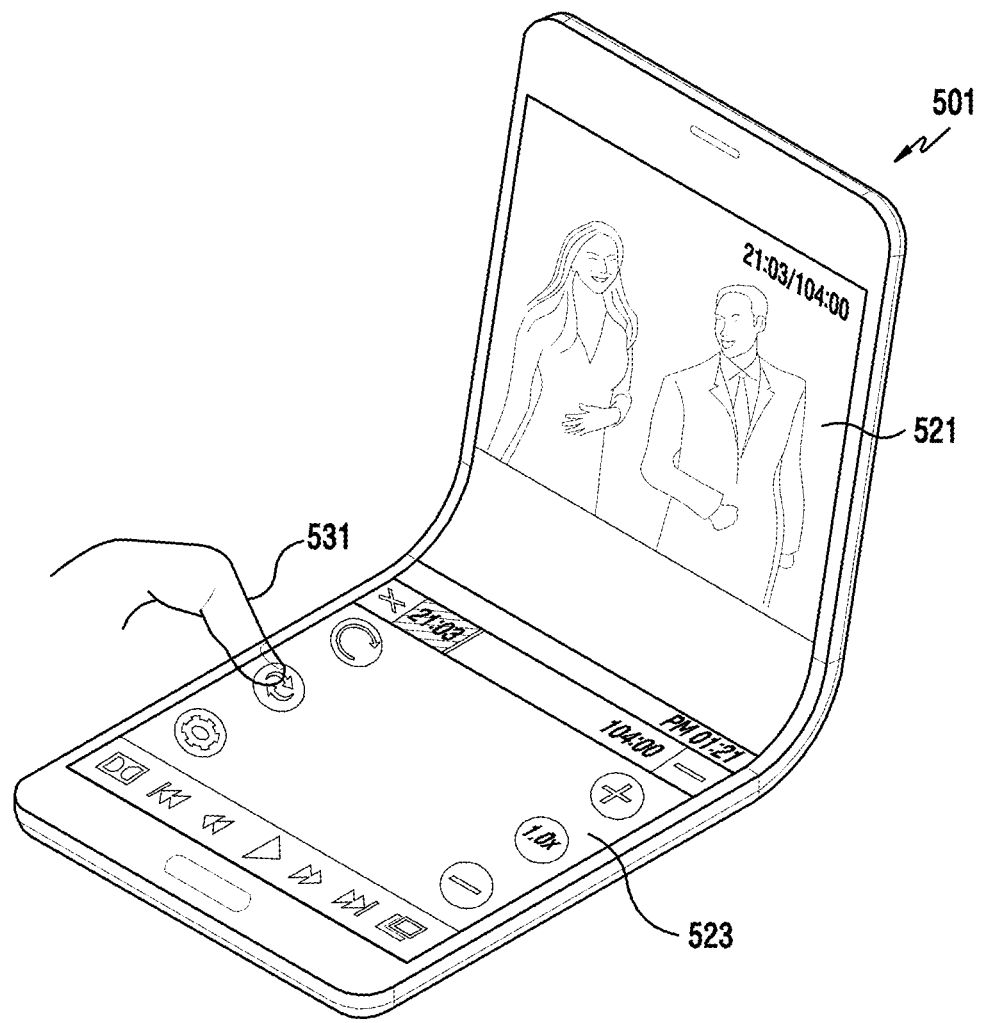
Figure 5E:
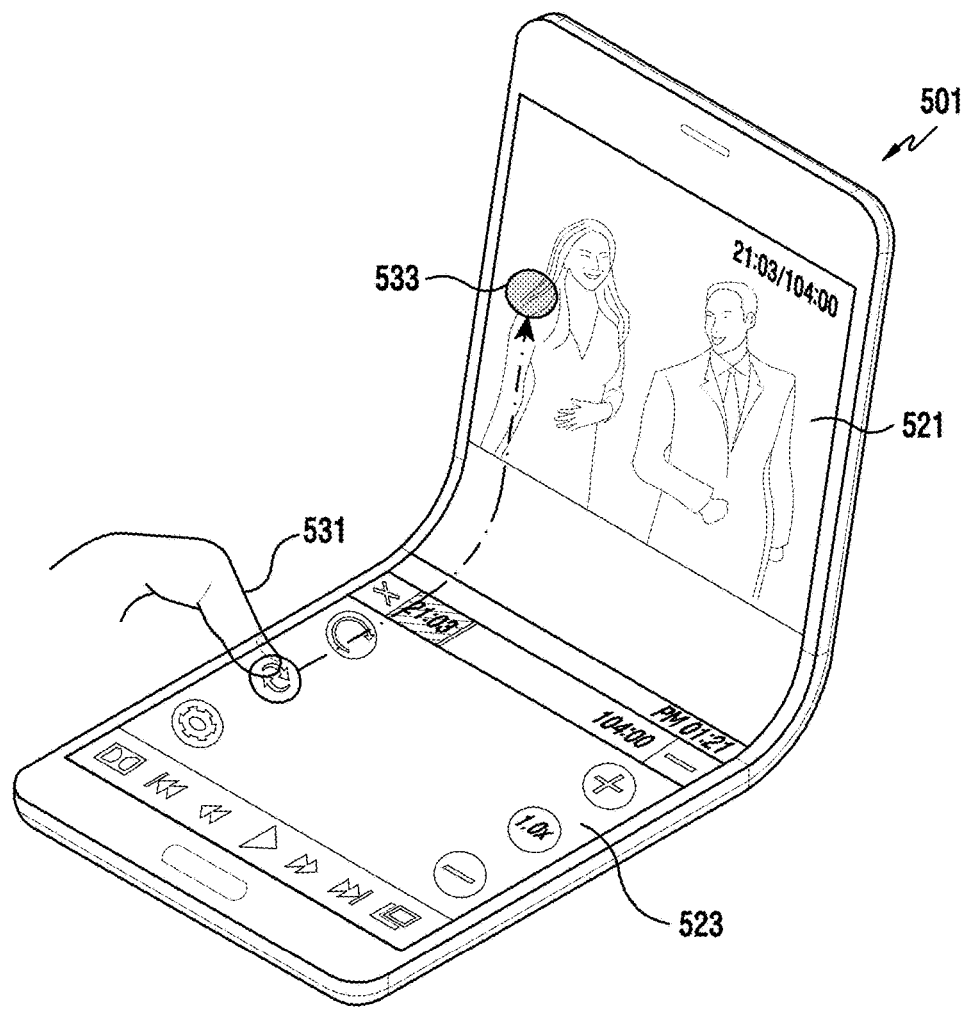

According to an embodiment of the present disclosure, upon detection of a touch input 531 for any one icon in the control displayed on the second area 523 as shown in FIG. 5D, the electronic device 501 may recognize that the first area 521 is touched, as shown by item 533, in FIG. 5E. That is, although one application is displayed in a divided manner on the first area 521 and the second area 523 when the display portion is bent, the touch input 531 of a user may be converted in a framework and thereafter may be delivered to the application (such as application 370). Accordingly, upon detection of a touch input on the second area 523, the electronic device 501 converts a coordinate of the touch input on the second area 523 into a touch coordinate for the first area 521 and then delivers it to the application (such as application 370).

Figure 6:
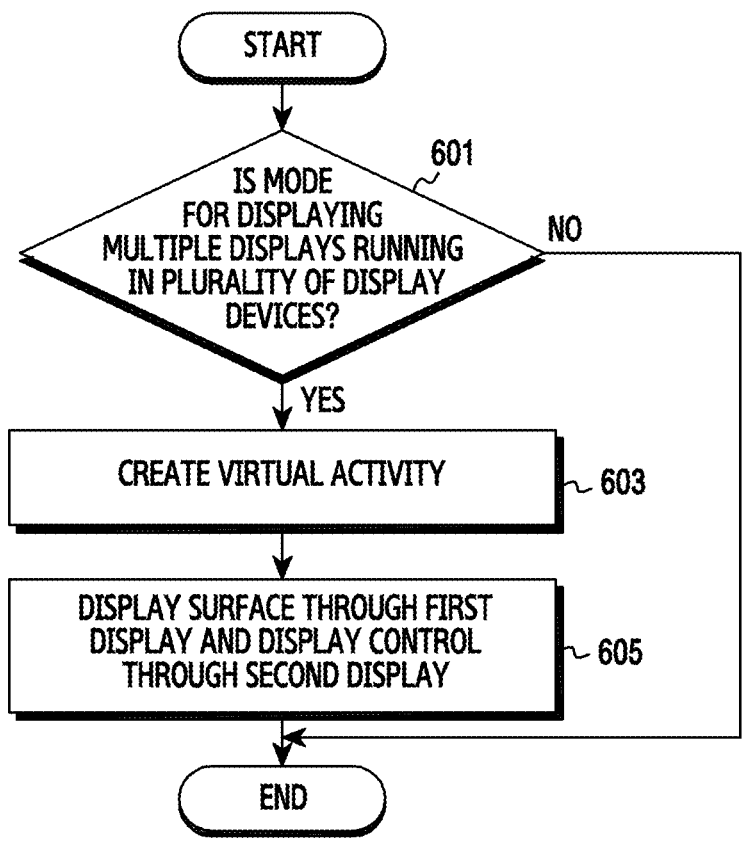
FIG. 6 illustrates a flowchart for controlling a plurality of displays in an electronic device according to an embodiment of the present disclosure.

FIG. 6 illustrates a flowchart for controlling a plurality of displays in an electronic device according to an embodiment of the present disclosure.

Figure 7A:
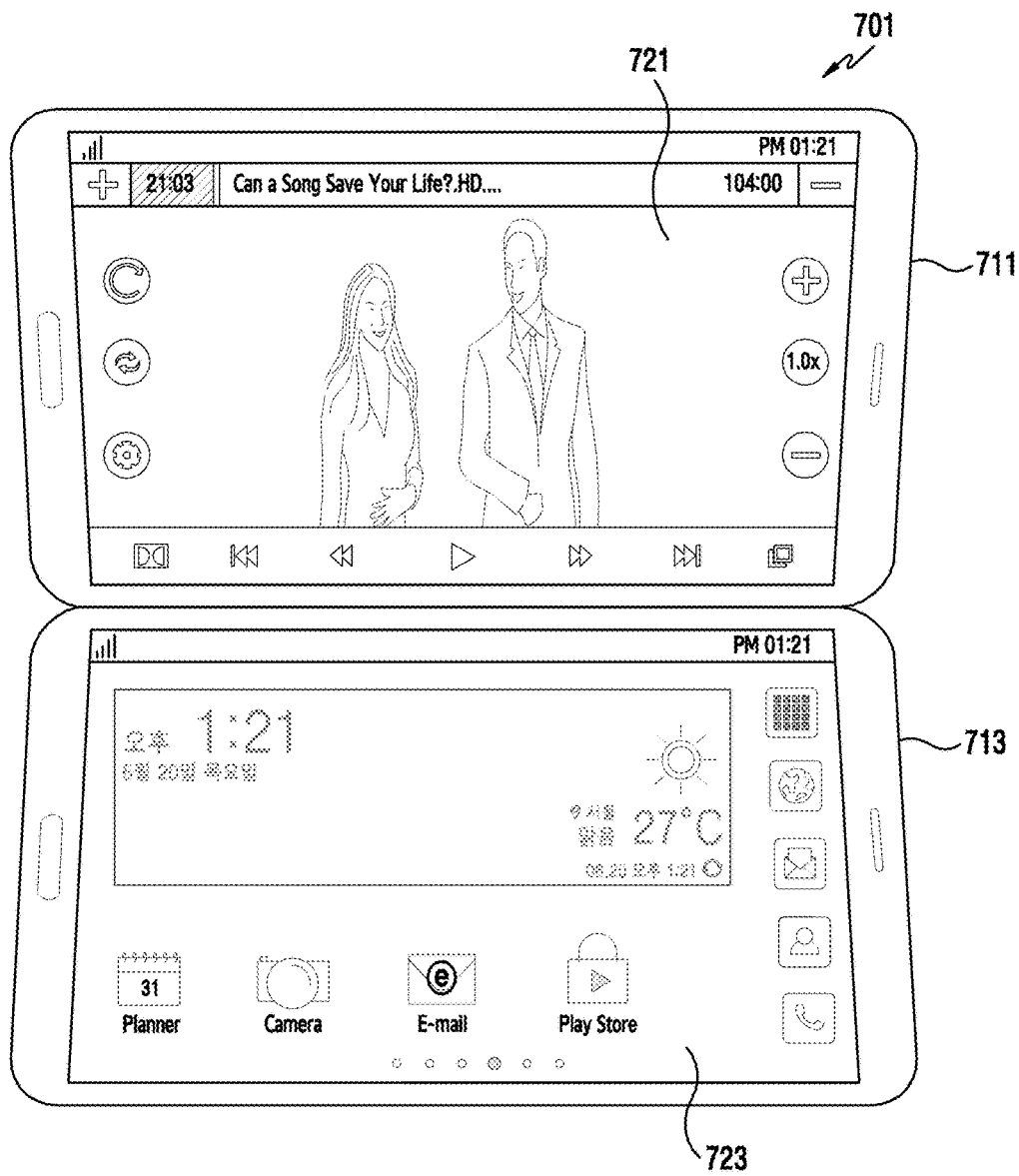
FIG. 7A to FIG. 7D illustrate a screen configuration for controlling a plurality of displays in an electronic device according to an embodiment of the present disclosure.

Referring to FIG. 6, in operation 601, the electronic device confirms whether a mode for displaying display data of one application on a plurality of displays is running. According to an embodiment of the present disclosure, as shown in FIG. 7A, an electronic device 701 may include electronic devices 711 and 713 having respective displays so that the electronic devices are controlled in one electronic device. As shown in FIG. 7A, the electronic device 701 may drive a moving picture application through a first display 721, and may display a main screen of the electronic device through a second display 723.

The electronic device may confirm whether a mode for displaying display data of one application on a plurality of displays is running on the basis of a user's menu selection.

The electronic device may confirm whether the mode for displaying display data of one application on a plurality of displays is running on the basis of an angle formed by the first display and the second display.

In operation 603, the electronic device creates a virtual activity. The electronic device (such as active manager) may create the virtual activity so that a window of an application currently displayed through the first display 721 is displayed on the second display 723.

Figure 7B:
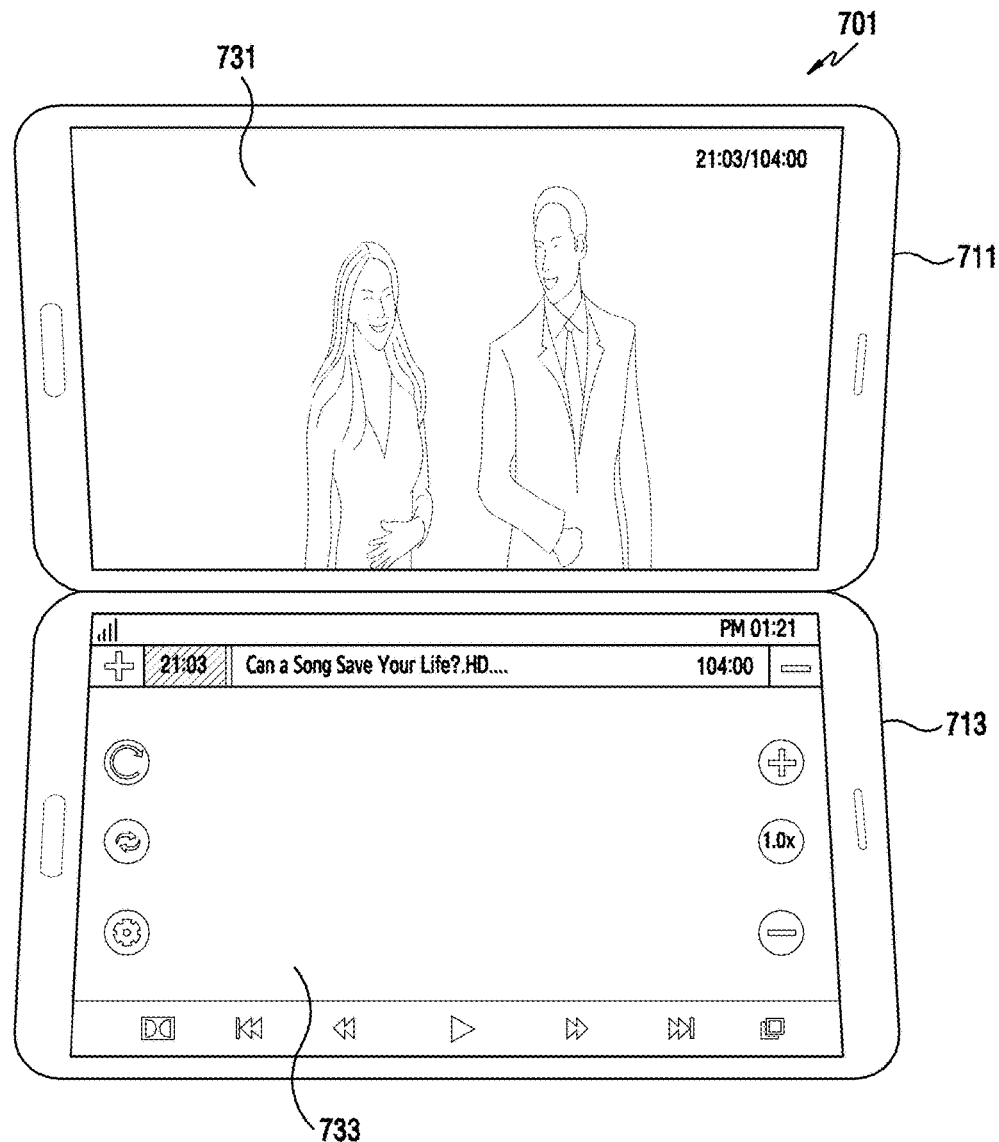

In operation 605, the electronic device displays a surface through the first display, and displays a control through the second display. As shown in FIG. 7B, the electronic device 701 (such as window manager 342) displays a moving picture corresponding to the surface of the application through a first display 731, and displays the control on a second display 733. That is, in a case where a multi-display mode is running while the moving picture is reproduced, the electronic device (such as window manager 342) may display the moving picture currently reproduced on any one display among a plurality of displays, and may display a menu (i.e., a control) for controlling the moving picture on the remaining displays. The electronic device (such as window manager 342) may display the control through the first display, and may display the surface of the application through the second display. Herein, the surface of the application includes display of content information executed in the application.

Figure 7C:
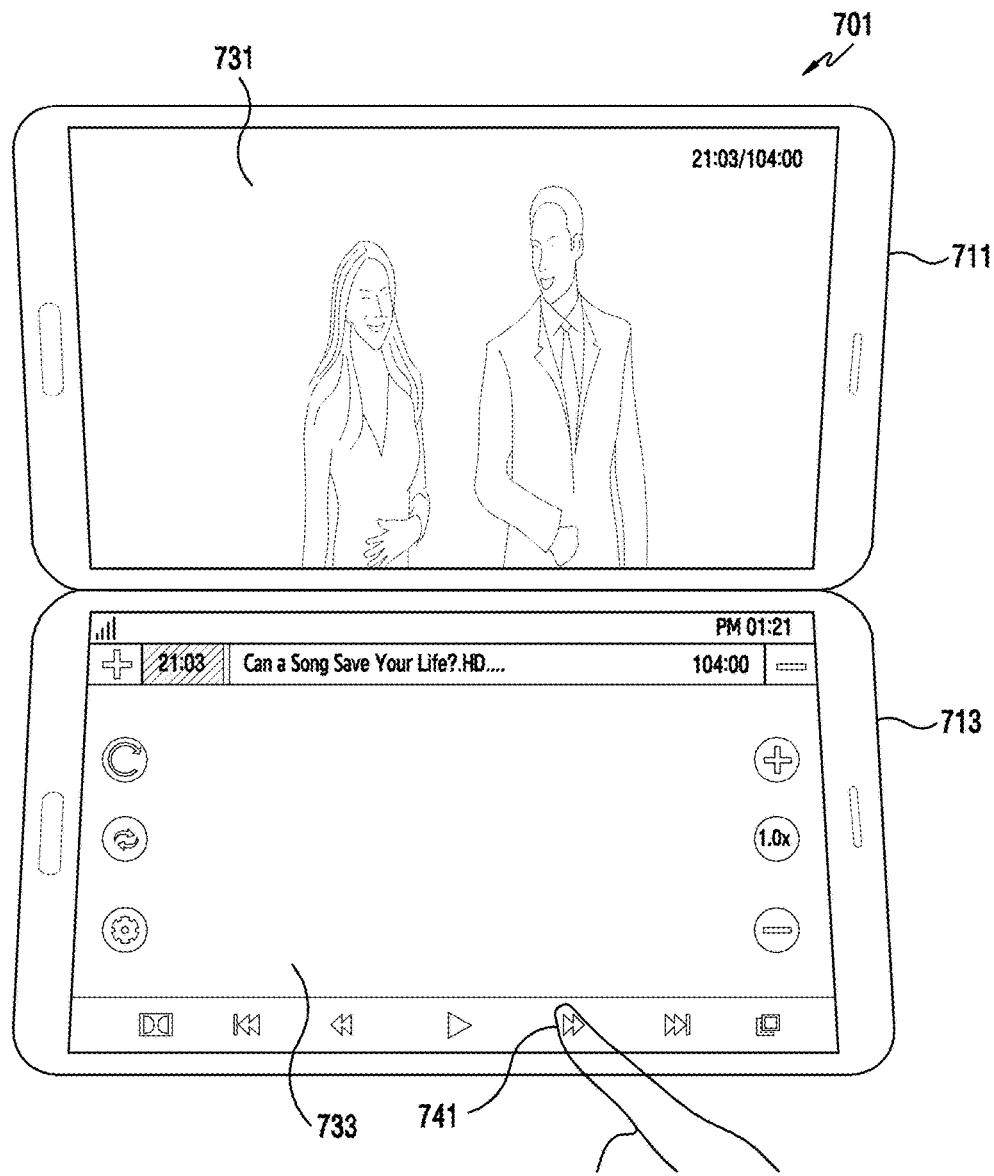
Figure 7D:
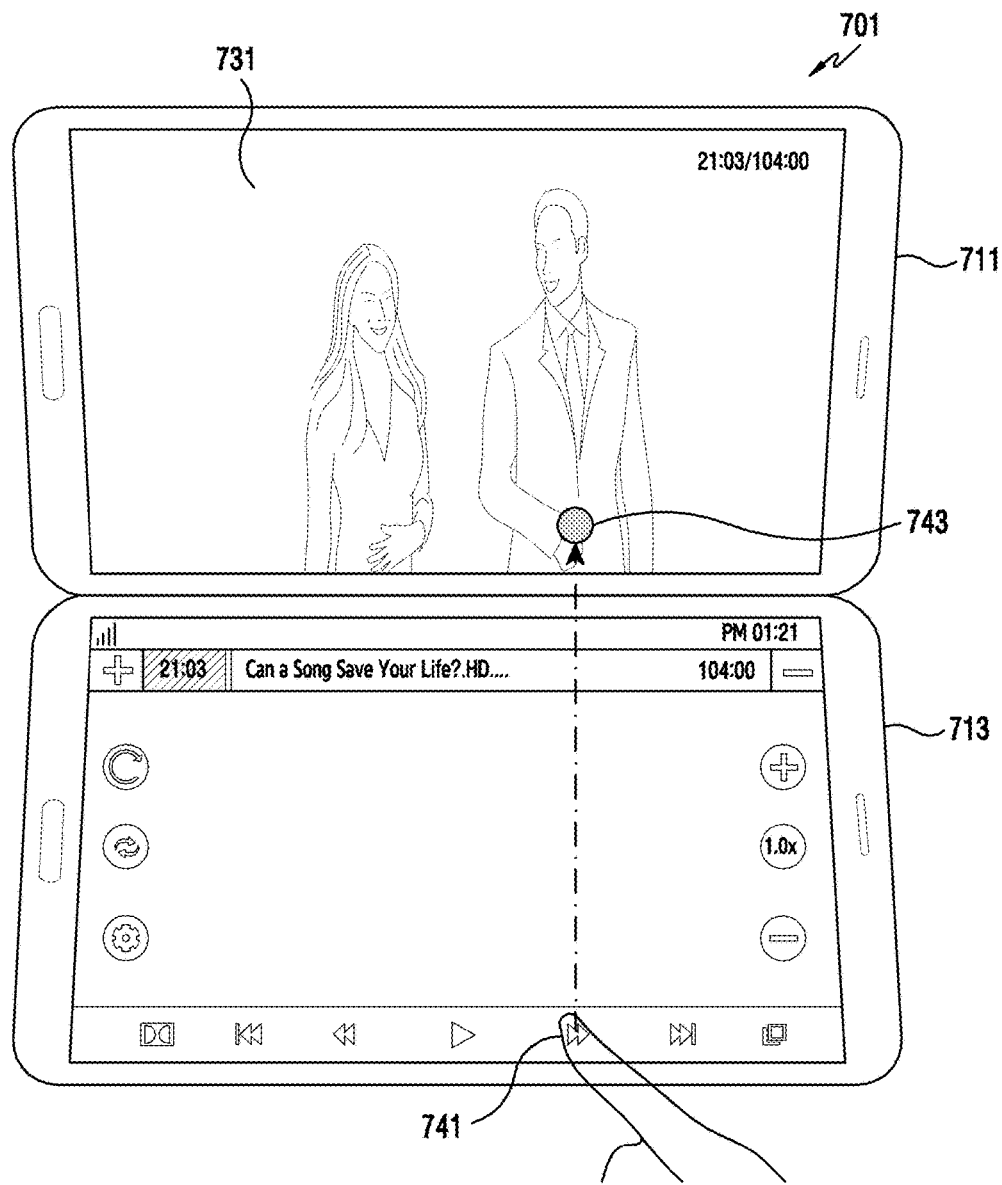

According to an embodiment of the present disclosure, upon detection of a touch input 741 for selecting any one icon in the control displayed on the second display 733 as shown in FIG. 7C, the electronic device 701 may recognize that the first display 731 is touched as shown by item 743 in FIG. 7D. That is, although one application is displayed on the first area 731 and the second area 733 in a divided manner when the multi-display mode is running, the touch input of a user may be converted in a framework and thereafter may be delivered to the application (such as application 370). Accordingly, although the user touches an icon of the second display 733, the electronic device may convert a touch coordinate for the second display 733 of the user into a touch coordinate for the first display 731 and then may deliver it to the application (such as application 370).

According to an embodiment of the present disclosure, a method of operating an electronic device includes dividing the display into a first area and a second area in response to detecting that the display is bent, displaying a surface of an application on the first display, and displaying a control menu of the application on the second display.

According to an embodiment of the present disclosure, the method may further include displaying the surface and the control menu of the application in the same area of the display before the display is bent.

According to an embodiment of the present disclosure, wherein, displaying the surface of the application on the first area of the display comprises scaling the size of the surface of the application corresponding to the size of the first area of the display.

According to an embodiment of the present disclosure, wherein, dividing the display into a first area and a second area in response to detecting that the display is bent comprises separating the first area and the second area on the basis of a boundary produced when the display is bent.

According to an embodiment of the present disclosure, the method may further include, when the first area and the second area of the display is detected, converting a touch coordinate for the second area into a touch coordinate for the first area and providing the converted touch coordinate to the application.

According to an embodiment of the present disclosure, the method may further include, when the first area and the second area of the display is detected, converting a touch coordinate for the first area into a touch coordinate for the second area and providing the converted touch coordinate to the application.

According to embodiment of the present disclosure, a method of operating an electronic device includes displaying an application on a first display among the plurality of displays, creating a virtual activity for displaying a control menu of the application on a second display among the plurality of displays when a request for displaying multiple displays is detected, displaying a surface of the application on the first display, displaying a control menu of the application on the second display among the plurality of displays on the basis of virtual activity.

According to various exemplary embodiments of the present disclosure, the creation of the virtual activity for displaying the control menu of the application on the second display among the plurality of displays may include detecting whether the request for displaying the multiple displays occurs on the basis of an input from a menu selection.

According to various exemplary embodiments of the present disclosure, the creation of the virtual activity for displaying the control menu of the application on a second display among the plurality of displays includes detecting whether the request for displaying the multiple displays occurs on the basis of an angle formed by the plurality of displays.

According to various exemplary embodiments of the present disclosure, the method may further include, when a touch event occurs on the second display, converting a touch coordinate for the second display into a touch coordinate for the first display and providing the converted touch coordinate to the application.

According to various exemplary embodiments of the present disclosure, the method may further include, when a touch event occurs for the first display, converting a touch coordinate for the first display into a touch coordinate for the second display and providing the converted touch coordinate to the application.

The term "module" as used herein refers to a unit including one of hardware, software, and firmware, or a combination of two or more of them. For example, the term "module" may be used interchangeably with terms like unit, logic, logical block, component or circuit. The "module" may be a minimum unit of an integrally configured part or a part of it. The "module" may be a minimum unit that performs one or more functions or a part of it. The "module" may be implemented mechanically or electronically. For example, the "module" may include at least one of an Application Specific Integrated Circuit (ASIC) chip, Field Programmable Gate Arrays (FPGAs), and a programmable logic device which perform any operation that is already well known or will be developed in the future.

At least part of the apparatus (for example, modules or functions) or method (for example, operations) according to various embodiments of the present disclosure may be implemented by using instructions stored in a computer-readable storage media in the form of a programming module. When the instructions are executed by one or more processors (for example, the processor 120), the one or more processors may perform a function corresponding to the instructions. The computer-readable storage media may be the memory 130.

Examples of the computer-readable recording medium include hard disks, floppy disks, magnetic media such as magnetic tapes, optical media such as Compact Disc Read Only Memories (CD-ROMs and Digital Versatile Discs (DVDs), magneto-optical media such as floptical disks, and hardware devices such as Read Only Memories (ROMs), Random Access Memories (RAMs) and flash memories. Examples of the program commands include machine language codes created by a compiler, and high-level language codes that can be executed by a computer by using an interpreter. The above-described hardware devices may be configured to operate as one or more software modules for performing operations of various embodiments of the present disclosure, and vice versa.

A module or programming module according to various embodiment of the present disclosure may include one or more of the above-described elements, may omit some elements, or may further include additional other elements. The operations performed by the module, the programming module, or the other elements may be performed serially, in parallel, repeatedly, or heuristically. In addition, some operation may be performed in different order or may be omitted, and additional other operations may be added.

In addition, the embodiments set forth herein are suggested to explain and understand features disclosed therein, and do not limit the scope of the technical features set forth in this document. Therefore, the scope of this document should be construed as including all changes based on the technical idea of this document or other various embodiments.

According to various embodiments of the present disclosure, a computer-readable storage medium storing instructions may be a computer-readable storage medium recording a program for executing operations of dividing the display into a first area and a second area in response to detecting that the display is bent, displaying a surface of an application on the first area of the display, and displaying a control menu of the application on the second area of the display.

According to various embodiments of the present disclosure, an electronic device rearranges a surface and control of an application, thereby being able to provide a user interface corresponding to various types in the electronic device having various displays.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:
1. An electronic device comprising:
a display; and
a processor configured to:
control the display to display an application screen comprising at least a surface displaying content information of an application and a control menu of the application, wherein the control menu is overlaid on the surface,
divide the display into a first area and a second area in response to detecting that the display is bent,
provide a screen size of the first area to the application in order to scale the application screen to a size corresponding to the first area,
control the display to display a scaled surface included in the scaled application screen on the first area of the display, and
control the display to display a scaled control menu included in the scaled application screen on the second area of the display.

2. The electronic device of claim 1, wherein the processor is configured to separate the first area and the second area on the basis of a boundary produced when the display is bent.

3. The electronic device of claim 1, wherein, when a touch input is detected in the second area, the processor is configured to convert a touch coordinate for the second area into a touch coordinate for the first area and provide the converted touch coordinate to the application.

4. The electronic device of claim 1, wherein, when a touch input is detected in the first area, the processor is configured to convert a touch coordinate for the first area into a touch coordinate for the second area and provides the converted touch coordinate to the application.

5. An electronic device comprising:
a plurality of displays; and
a processor configured to:
control a first display of the plurality of displays to display an application screen comprising at least a surface displaying content information of an application and a control menu of the application, wherein the control menu is overlaid on the surface,
create a virtual activity to separately display the control menu on a second display of the plurality of displays in response to detecting a request for executing multiple displays,
control the first display to display the surface comprised in the application screen on the first display as a full screen, and
control the second display to display the control menu comprised in the application on the second display using the virtual activity.

6. The electronic device of claim 5, wherein the processor is configured to detect whether the request for executing the multiple displays occurs on the basis of an input from a menu selection.

7. The electronic device of claim 5, wherein the processor is configured to detect whether the request for executing the multiple displays occurs on the basis of an angle formed by the first display and the second display.

8. The electronic device of claim 5, wherein when a touch event occurs on the second display, the processor is configured to convert a touch coordinate for the second display into a touch coordinate for the first display and provides the converted touch coordinate to the application.

9. A method of operating an electronic device, the method comprising:
displaying, on a display, an application screen comprising at least a surface displaying content information of an application and a control menu of the application, wherein the control menu is overlaid on the surface;
dividing the display into a first area and a second area in response to detecting that the display is bent;
providing a screen size of the first area to the application in order to scale the application screen to a size corresponding to the first area;
displaying a scaled surface included in the scaled application screen on the first area of the display; and displaying a scaled control menu included in the scaled application screen on the second area of the display.

10. The method of claim 9, wherein, dividing the display into the first area and the second area in response to detecting that the display is bent comprises separating the first area and the second area on the basis of a boundary produced when the display is bent.

11. The method of claim 9, further comprising:
when the touch input is detected in the second area, converting a touch coordinate for the second area into a touch coordinate for the first area and providing the converted touch coordinate to the application.

12. The method of claim 9, further comprising:
when the touch input is detected in the first area, converting a touch coordinate for the first area into a touch coordinate for the second area and providing the converted touch coordinate to the application.

13. A method of operating an electronic device, the method comprising:
displaying, on a first display among a plurality of displays, an application screen comprising at least a surface displaying content information of an application and a control menu of the application, wherein the control menu is overlaid on the surface;
creating a virtual activity to separately display the control menu on a second display among the plurality of displays in response to detecting a request for executing multiple displays,
displaying the surface comprised in the application screen on the first display as a full screen, and
displaying the control menu comprised in the application screen on the second display using the virtual activity.

14. The method of claim 13, wherein the request for executing the multiple displays occurs on the basis of an input from a menu selection.

15. The method of claim 13, wherein the request for executing the multiple displays occurs on the basis of an angle formed by the plurality of displays.

16. The method of claim 13, further comprising:
when a touch event occurs on the second display, converting a touch coordinate for the second display into a touch coordinate for the first display and providing the converted touch coordinate to the application.

* * * * *